(12) United States Patent
Taki (10) Patent No.: US 9,584,881 B2
(45) Date of Patent: Feb. 28, 2017

(54) TIRE-PRESSURE SENSOR UNIT AND A TIRE-PRESSURE INFORMATION DEVICE

(71) Applicant: TOYOTA JIDOSHA KABUSHIKI KAISHA, Toyota-shi, Aichi (JP)

(72) Inventor: Yuji Taki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/017,078

(22) Filed: Feb. 5, 2016

(65) Prior Publication Data
US 2016/0229239 A1 Aug. 11, 2016

(30) Foreign Application Priority Data

Feb. 6, 2015 (JP) .................................. 2015-022057

(51) Int. Cl.
B60C 23/00 (2006.01)
H04Q 9/00 (2006.01)
B60C 23/04 (2006.01)

(52) U.S. Cl.
CPC ........... *H04Q 9/00* (2013.01); *B60C 23/0416* (2013.01); *B60C 23/0489* (2013.01); *H04Q 2209/10* (2013.01); *H04Q 2209/40* (2013.01)

(58) Field of Classification Search
CPC .. H04Q 9/00; H04Q 2209/10; H04Q 2209/40; B60C 23/0416; B60C 23/0489

USPC ..................... 340/447, 442; 73/146; 702/138
See application file for complete search history.

(56) References Cited

U.S. PATENT DOCUMENTS

| 2011/0313623 | A1* | 12/2011 | Greer | ...................... | G06F 11/30 701/49 |
| 2014/0371980 | A1 | 12/2014 | Sekizawa et al. | | |
| 2014/0379291 | A1* | 12/2014 | Mori | .................... | B60C 23/0416 702/138 |
| 2015/0020584 | A1* | 1/2015 | Okada | ................. | B60C 23/0416 73/146.2 |

FOREIGN PATENT DOCUMENTS

JP 2013-159265 A 8/2013

* cited by examiner

*Primary Examiner* — Kerri McNally
(74) *Attorney, Agent, or Firm* — Oliff PLC (57) ABSTRACT

A tire-pressure information device should receive wheel information within a demanded detection time. A transmission controller of a sensor unit transmits wheel information as a radio signal at the timing when the turning position θ of the sensor unit detected by an acceleration sensor arrives at the transmission setting location α after 1 minute has passed since the last transmission of the wheel information. This transmission setting location α is set to a turning position which is advanced or retarded a setting adjustment angle Δα (for instance, 146 degree) set to a value which is not a divisor of 360, with respect to the turning position θ when the last wheel information is transmitted last time.

8 Claims, 8 Drawing Sheets

TIRE-PRESSURE SENSOR UNIT AND A TIRE-PRESSURE INFORMATION DEVICE

TECHNICAL FIELD

The present invention relates to a tire-pressure sensor unit which is fixed to a wheel and transmits tire-pressure information representing a tire pressure as a radio signal, and a tire-pressure information device which receives the tire-pressure information and reports it to a driver.

BACKGROUND ART

Conventionally, a tire-pressure monitor system (Tire Pressure Monitoring System: TPMS) which informs a driver of tire-pressure information has been known. While the tire-pressure monitor system comprises a tire-pressure sensor unit (hereafter, will be referred to as a sensor unit) which detects a tire pressure for each wheel, and is configured to transmit tire-pressure information as a radio signal from this sensor unit and receive this radio signal by a tire-pressure information device disposed on a vehicle body side to acquire the tire-pressure information. When judged that the tire pressure has decreased based on the received tire-pressure information, the tire-pressure information device displays that on an annunciator to notify it to a driver.

For instance, a sensor unit disposed in the tire-pressure monitor system proposed in the Patent Document 1 (PTL1) has an acceleration sensor built-in, and extracts a gravitational-acceleration component detected by this acceleration sensor. Since the sensor unit circles around an axle shaft of a wheel, the gravitational-acceleration component detected by the acceleration sensor is sinusoidally rippled in accordance with the rotation of a wheel. The sensor unit detects its own rotation angle (turning position) based on this gravitational-acceleration component, and repeatedly transmits a radio signal at the timing when this rotation angle becomes a predetermined angle. Such a transmission is referred to as a fixed-angle transmission mode.

In this system, the tire-pressure information device distinguishes the wheel location to which the sensor unit that transmitted the radio signal is attached, based on the number of pulse signals which the wheel-speed sensors of respective wheels output at the timing when the radio signal transmitted from the sensor unit is received.

Moreover, the sensor unit switches the transmission timing of the radio signal to a periodical transmission mode with a predetermined time period (for instance, 1 minute), after the time period required for wheel location discrimination has passed. Thereby, the tire-pressure information device can monitor a tire pressure periodically.

CITATION LIST

Patent Literature

[PTL1] The Japanese Patent Application Laid-Open "kokai" No. 2013-159265

SUMMARY OF INVENTION

Figure 8:
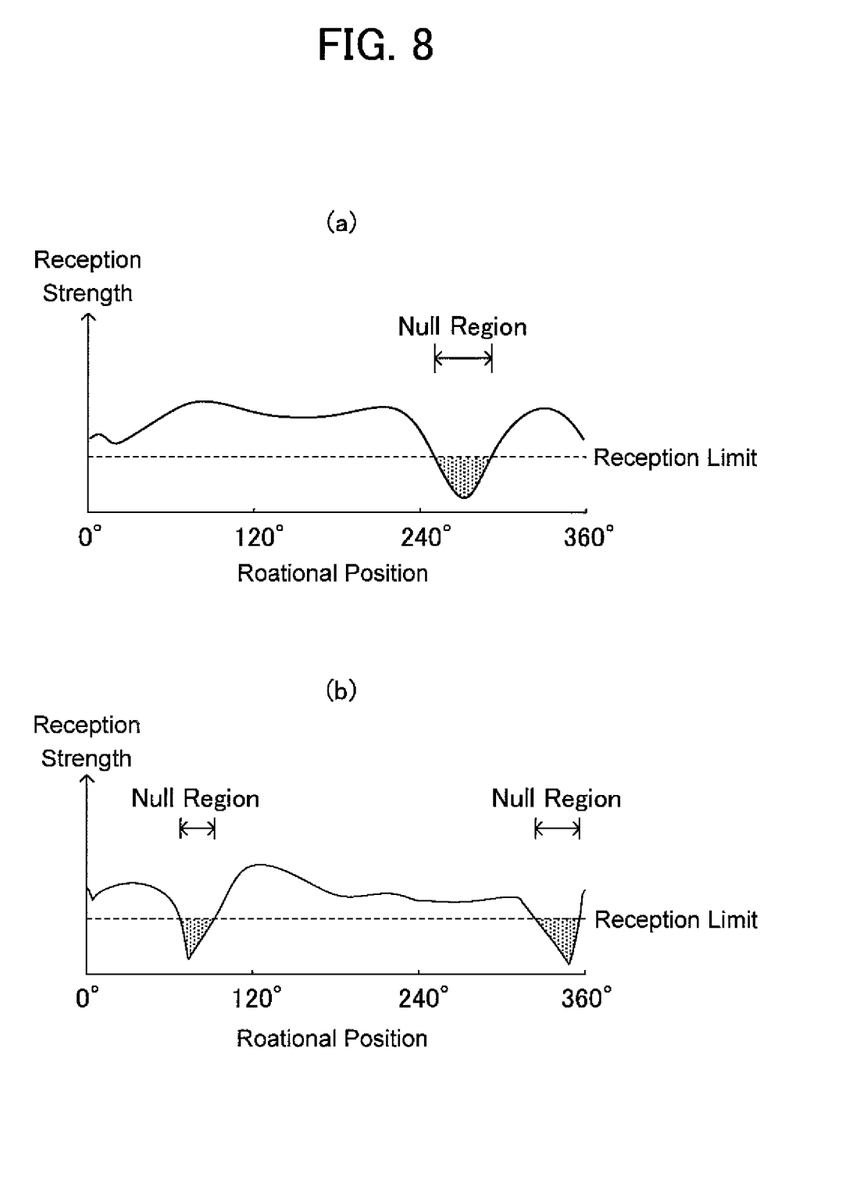
FIG. 8 is a graph showing a relation between the rotational position of a wheel and the reception strength of a radio signal.

By the way, the reception strength when the tire-pressure information device receives the radio signal changes depending on the turning position of the sensor unit. For this reason, depending on the turning position of the sensor unit, the tire-pressure information device may be unable to receive the radio signal. FIG. 8 shows two examples ((a), (b)) of the relation between the rotational position of a wheel (turning position of a sensor unit) and a signal reception strength. As shown in this drawing, the signal reception strength depends on the rotational position of a wheel. For this reason, depending on the rotational position of a wheel, the signal reception strength may be less than a reception limit. This region where the signal reception strength is less than the reception limit is referred to as a Null region. The Null regions respectively exist in different rotational positions for respective vehicles and wheels.

For this reason, in the fixed-angle transmission mode in which a radio signal is transmitted when the turning position of a sensor unit becomes a predetermined fixed angle, the tire-pressure information device can never receive a radio signal as long as the turning position of the sensor unit is in the Null region when the radio signal is transmitted.

Moreover, even if it is in the periodical transmission mode in which a radio signal is transmitted in a fixed period, the rotational position at the time of transmission may concentrate in the Null region. For this reason, even though the sensor unit is repeatedly transmitting the radio signal, a status that the tire-pressure information device cannot receive the radio signal may continue.

In a tire-pressure monitor system, it is required that a tire pressure can be monitored within a predetermined demanded detection time. Therefore, although this requirement can be met when a radio signal can be received even once in the demanded detection time, this requirement cannot be met when a radio signal can never be received.

It can be supposed to shorten the transmission period of a radio signal in order to enable it to receive a radio signal once or more within the predetermined demanded time, but in that case, consumption of a battery will become large and will shorten a battery life. Since a sensor unit is attached to an air feeding valve portion, it is small and the size of the battery to be built-in is also restricted. For this reason, when the transmission period of a radio signal is shortened as mentioned above, it becomes impossible to meet the downsizing demand of a sensor unit.

Therefore, the number of transmission within the demanded time is restricted. Then, in order to make as small as possible the probability that no radio signal is received, to the number of times of transmission appointed beforehand, a considerably high reception performance of a tire-pressure information device is required, and it is difficult to implement it.

The present invention has been conceived in order to cope with the above-mentioned issue, and its objective is in that the tire-pressure information device can receive the radio signal at a high probability while suppressing the battery consumption.

In order to attain the above-mentioned objective, a feature of the present invention is in that a tire-pressure sensor unit (10) comprises:

a pneumatic sensor (11) which detects a tire pressure, a transmitter (16) which transmits wheel information that is information including tire-pressure information representing the tire pressure detected by said pneumatic sensor and a unique sensor ID as a radio signal, and a battery (17) prepared as an internal electrical power source, and said tire-pressure sensor unit is fixed to and disposed in a wheel and circles around an axle shaft along with the rotation of said wheel, wherein;

said tire-pressure sensor unit further comprises:

a turning-position detection means (13, 15, S14) to detect the turning position (θ degree) of said tire-pressure sensor unit around the axle shaft, a transmission control means (15, S15 to S16) to make said transmitter transmit said wheel information at the timing when the turning position detected by said turning-position detection means arrives at a transmission setting location (α degree), a transmission location setting means (15, S17) to calculate a turning position which is advanced or retarded a setting adjustment angle (Δα degree) set to a value (Δα) which is not a divisor of 360, with respect to the turning position when said wheel information is transmitted last time, and to set this turning position obtained by calculating as a transmission setting location (a degree) for transmitting said wheel information next time.

The tire-pressure sensor unit according to the present invention is fixed to and disposed in a wheel and circles around an axle shaft along with the rotation of the wheel. The tire-pressure sensor unit comprises a pneumatic sensor, a transmitter and a battery. The pneumatic sensor detects a tire pressure. The transmitter transmits wheel information which includes tire-pressure information showing the tire pressure detected by the pneumatic sensor and a unique sensor ID as a radio signal. The sensor ID is unique discrimination information which specifies a tire-pressure sensor unit. For example, the wheel information is received by a tire-pressure information device disposed on a vehicle body side, and is used for reporting the tire pressure.

An electric power is supplied from a battery to an electrical load (element which operates with an electric power) disposed in the tire-pressure sensor unit. It is desired that the life-time of this battery is secured to be the same extent as the life-time of a vehicle. In order to suppress the battery consumption due to transmission of the wheel information as much as possible, it is necessary to restrict the number of times of transmission of the wheel information. For this reason, it is desired that a receiver (for instance, the tire-pressure information device) can receive the wheel information with a high probability within a limited number of times of transmission.

Toward that end, the tire-pressure sensor unit comprises a turning-position detection means, a transmission control means and a transmission location setting means. The turning-position detection means detects the turning position of the tire-pressure sensor unit around the axle shaft. For instance, the turning-position detection means comprises an acceleration sensor, and detects acceleration generated when a wheel rotates, such as acceleration in a direction of centrifugal force of the wheel and acceleration in a direction of a circumference of the wheel. Gravitational acceleration is contained in this acceleration. A gravitational-acceleration component is rippled along with the rotation of the wheel (circling of the tire-pressure sensor unit). Therefore, the turning position of the tire-pressure sensor unit around the axle shaft can be detected by detecting the gravitational-acceleration component.

The transmission control means makes a transmitter transmit the wheel information at the timing when the turning position detected by the turning-position detection means arrives at the transmission setting location. In this case, it only has to make the transmitter transmit the wheel information at the timing when the turning position detected by the turning-position detection means arrives at the transmission setting location, and it does not need to make the transmitter transmit the wheel information whenever it arrives at the transmission setting location.

The transmission location setting means calculates the turning position which is advanced or retarded a setting adjustment angle set to a value which is not a divisor of 360, with respect to the turning position when the wheel information is transmitted last time, and sets this turning position obtained by calculating as a transmission setting location for transmitting the wheel information next time. Therefore, the transmission setting location advances or retards the setting adjustment angle at every transmission of the wheel information. For this reason, the turning position for transmitting the wheel information is never held in the Null region in which the wheel information cannot be received on the receiver side.

Furthermore, since the setting adjustment angle is set to the value which is not a divisor of 360, the transmission setting location never returns to its original value (past transmission setting location) in an early stage while transmission of the wheel information is repeated. Therefore, whole circumference of the wheel can be effectively used to change the transmission setting location. That is, the transmission setting location can be changed to many parts in the direction of the circumference of the wheel.

Thus, in accordance with the present invention, even when the Null region in which the receiver cannot receive the wheel information exists, the wheel information can be transmitted to (be received by) the receiver with a high probability within a desired number of times of transmission. As a result, the period in which the wheel information is transmitted can be lengthened, and consumption of the battery can be suppressed.

The feature of one aspect of the present invention is in that said setting adjustment angle is set to a value which is larger than 90 degrees and smaller than 270 degrees.

In accordance with the one aspect of the present invention, since the setting adjustment angle is set to a value larger than 90 degrees and smaller than 270 degrees, the transmission setting locations can be distributed all over the circumference of the wheel W in an early stage. For this reason, even if the transmission setting location at the time of transmission of the wheel information for the first time fell within the Null region, the transmission setting location can shift out of the Null region early. In addition, the angles and locations in the present invention fall within a range from 0 degree to 360 degrees (since it returns to the original location when the wheel rotates one revolution (360-degree rotation)).

The feature of another aspect of the present invention is in that said transmission control means is configured to make said transmitter transmit said wheel information at the timing when the turning position detected by said turning-position detection means arrives at the transmission setting location set by said transmission location setting means for the first time after a predetermined set period has passed since said wheel information was transmitted last time (S13 to S15, S18).

In accordance with the above-mentioned one aspect of the present invention, the wheel information is transmitted from the transmitter at the timing when the turning position detected by the turning-position detection means arrives at the transmission setting location for the first time after a predetermined set period has passed since the wheel information was transmitted last time. Therefore, the transmission time interval of the wheel information can be set properly, and consumption of the battery can be suppressed properly.

The present invention can be applied not only to a tire-pressure sensor unit, but also to a tire-pressure information device disposed on a vehicle body side.

The feature of this tire-pressure information device is in that a tire-pressure information device (50, 100), which receives said wheel information transmitted from the tire-pressure sensor unit and reports said tire-pressure information to a driver in distinction to every wheel location, comprises:

a wheel rotational-position detection means (S32) to detect the rotational positions of respective wheels based on the count values obtained by counting, for respective wheel-speed sensors, the numbers of pulse signals which are output signals of a plurality of the wheel-speed sensors (60) disposed for respective of said wheels and are outputted whenever the respective of said wheels rotates a predetermined angle, a variation detection means (S37) to acquire the rotational position of respective wheels detected by said wheel rotational-position detection means whenever receiving said wheel information transmitted from the respective of said tire-pressure sensor units, and to detect the rotational-position variation ($\Delta N$) which is a variation of the rotational position of a wheel when the wheel information is received this time with respect to the rotational position of the wheel when the wheel information was received last time, for every said sensor ID and for each wheel, and a wheel location discrimination means (S38) to distinguish the location of a wheel to which the tire-pressure sensor unit specified by said sensor ID is attached, based on a relation between the rotational-position variation detected by said variation detection means and said setting adjustment angle.

The tire-pressure information device according to the present invention receives the wheel information transmitted from the tire-pressure sensor unit, and reports the tire-pressure information to a driver in distinction to every wheel location. In order to do so, the tire-pressure information device comprises a wheel rotational-position detection means, a variation detection means and a wheel location discrimination means.

The wheel rotational-position detection means detects the rotational positions of the respective wheels, based on the count values obtained by counting, for respective wheel-speed sensors, the numbers of the pulse signals which are output signals of a plurality of the wheel-speed sensors prepared for the respective of the wheels (one wheel-speed sensor is disposed in each wheel) and are outputted whenever the respective of the wheels rotates a predetermined angle. In this case, the wheel rotational-position detection means may directly acquire the pulse signals which the wheel-speed sensor outputs to count their number, and may be configured to acquire the count values of the pulse signals via a brake control device which is inputted the pulse signals outputted by the wheel-speed sensor and calculates a wheel speed. Each wheel-speed sensor outputs a pulse signal whenever a wheel rotates a predetermined angle. Therefore, the rotational position of a wheel can be detected by integrating (counting) the number of the pulse signals.

Whenever the variation detection means receives the wheel information transmitted from the respective of the tire-pressure sensor units, it acquires the rotational position of each wheel detected by the wheel rotational-position detection means, and detects the rotational-position variation which is a variation of the rotational position of a wheel when the wheel information is received this time with respective to the rotational position of the wheel when the wheel information is received last time, for every sensor IDs, for each wheel.

Fundamentally, when the tire-pressure sensor unit and the wheel-speed sensor are disposed in a common wheel, the rotational position (corresponding to the count value of the pulse signals) of the wheel at the transmission timing should always change by the setting adjustment angle whenever the wheel information is transmitted from the tire-pressure sensor unit. On the other hand, when the tire-pressure sensor unit and the wheel-speed sensor are not disposed in a common wheel, the rotational position (corresponding to the count value of the pulse signal) of the wheel at the transmission timing does not always change by the setting adjustment angle. This is because a rotational-speed difference due to an inner ring difference, an outer wheel difference and/or a slip, etc. arises between one wheel in which the tire-pressure sensor unit is disposed and the other wheel in which the wheel-speed sensor is disposed.

The wheel location discrimination means distinguishes the location of a wheel, to which the tire-pressure sensor unit specified by the sensor ID is attached, from a relation between the rotational-position variation detected by the variation detection means and the setting adjustment angle, using such a principle. For instance, the rotational-position variation detected by the variation detection means becomes the same value as the setting adjustment angle or a value near the setting adjustment angle, and does not vary greatly. Moreover, even when some of the repeated transmissions of the wheel information could not be received, the rotational-position variation detected by the variation detection means becomes the same value as the whole-number ($\geq 2$) multiple of the setting adjustment angle or a value near the whole-number ($\geq 2$) multiple of the setting adjustment angle, and does not vary greatly. Therefore, the wheel location, in which the wheel-speed sensor having a property that its rotational-position variation thus transitions is disposed, can be distinguished as the wheel location where the tire-pressure sensor unit is disposed.

As a result, in accordance with the tire-pressure information device according to the present invention, even when the turning position $\theta$ at which the tire-pressure sensor unit transmits the wheel information changes at every transmission, the wheel location of a tire-pressure sensor unit can be distinguished successfully.

In addition, in the above-mentioned explanation, in order to help understanding of the invention, the reference signs used in an embodiment are attached in parenthesis to the configuration of the invention corresponding to the embodiment, but each constituent elements of the invention are not limited to the embodiment specified with the above-mentioned reference signs.

DESCRIPTION OF EMBODIMENTS

Figure 1:
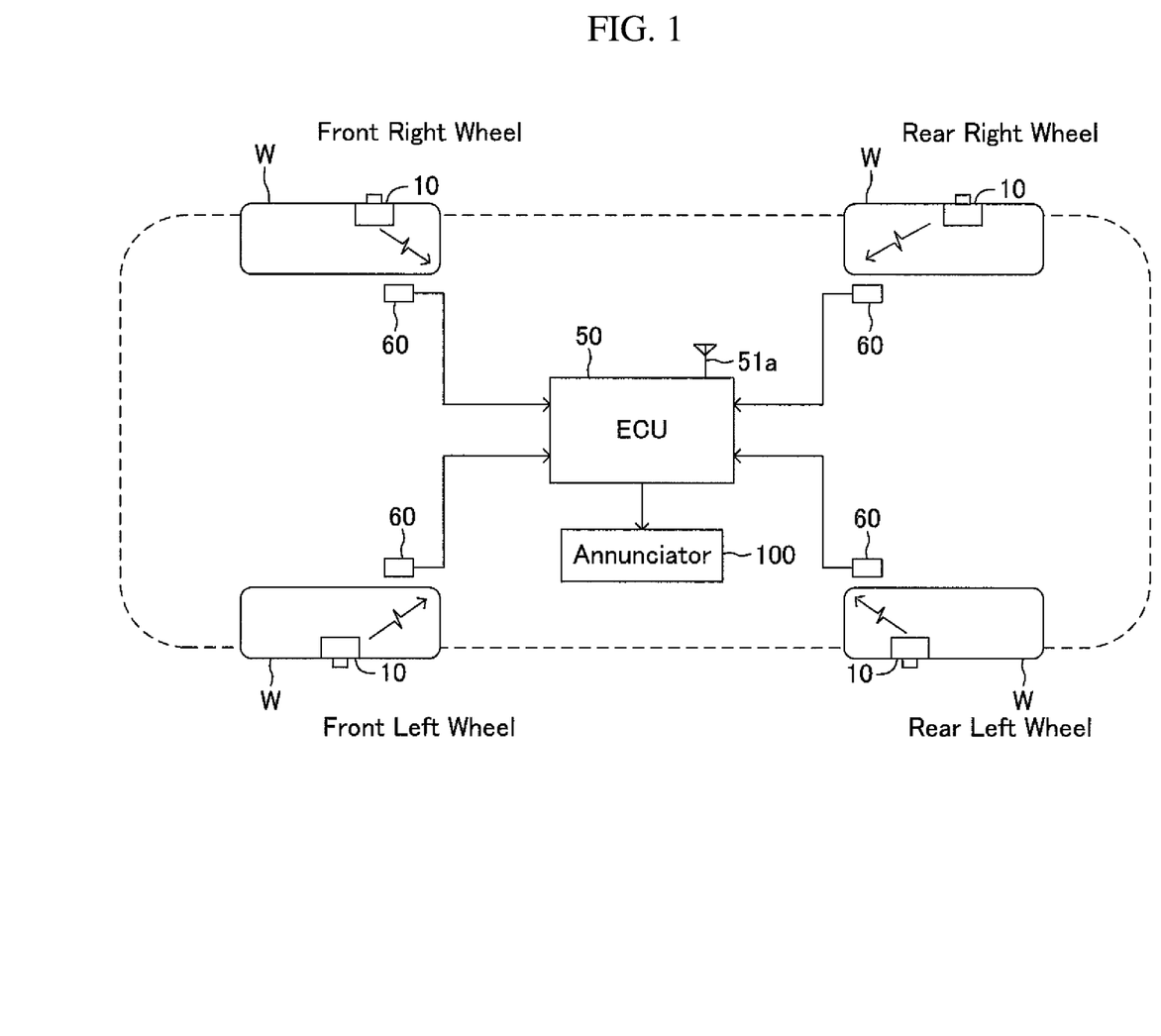
FIG. 1 is a schematic diagram of a tire-pressure monitor system according to an embodiment of the present invention.

Hereafter, "a tire-pressure sensor unit and the tire-pressure monitor system for a vehicle equipped with a tire-pressure information device" according to one embodiment of the present invention will be explained using drawings. FIG. 1 shows the schematic configuration of the tire-pressure monitor system for a vehicle.

Figure 2:
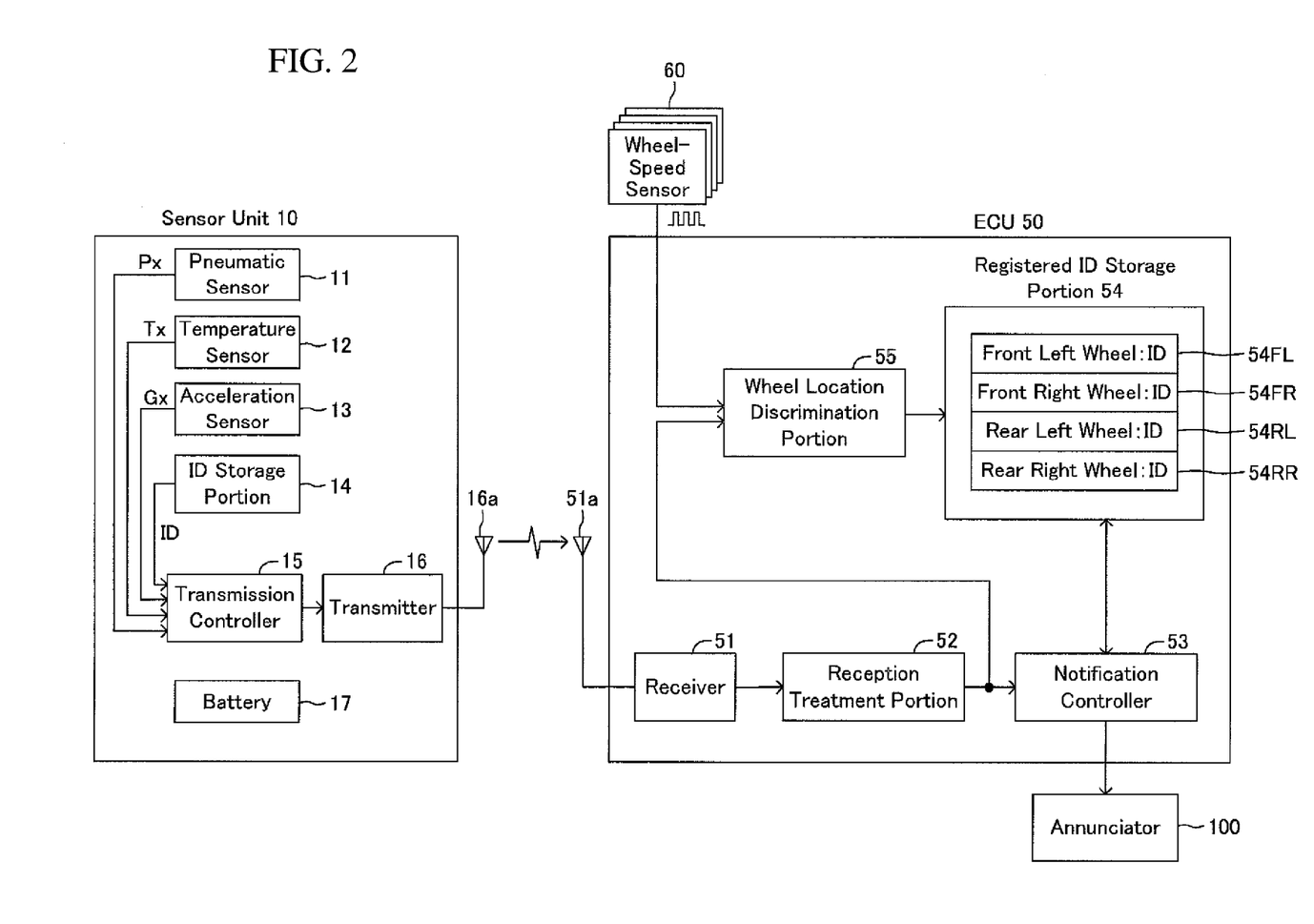
FIG. 2 is a functional block diagram in a sensor unit and an ECU.

The tire-pressure monitor system is a system for reporting the air pressure information of a tire to a driver, and comprises the tire-pressure sensor unit 10 (hereafter, will be referred to as the sensor unit 10) fixed to each wheel W, the tire-pressure information control unit (hereafter, will be referred to as the ECU 50) fixed to vehicle body B and the annunciator 100. The configuration which consists of the ECU 50 and the annunciator 100 is equivalent to the tire-pressure information device according to the present invention. FIG. 2 shows a functional block diagram in the sensor unit 10 and the ECU 50. Since all the sensor units 10 disposed in respective wheel Ws have the same function, FIG. 2 shows one of them. Hereafter, the sensor unit 10 will be explained.

The sensor unit 10 is attached to the tire air injection valve fixed to the rim of the wheel W. The sensor unit 10 comprises a pneumatic sensor 11, a temperature sensor 12, an acceleration sensor 13, an ID storage portion 14, a transmission controller 15, a transmitter 16, and a battery 17, as shown in FIG. 2. These constituent elements 11 to 17 are contained and unitized in one casing. The pneumatic sensor 11 detects the air pressure of a tire and outputs a detection signal which represents the air pressure Px to the transmission controller 15. The temperature sensor 12 detects the temperature of the tire and outputs a detection signal which represents the tire temperature Tx to the transmission controller 15. The acceleration sensor 13 detects the acceleration in a direction of centrifugal force of the wheel W and outputs a detection signal which represents the acceleration Gx to the transmission controller 15. The ID storage portion 14 is a non-volatile memory which memorizes the sensor IDs which are discrimination information of the sensor units 10, and outputs the sensors ID to the transmission controller 15.

The transmission controller 15 comprises a microcomputer as a principal part, generates transmission data containing the tire temperature Tx detected by the temperature sensor 12, the air pressure Px detected by the pneumatic sensor 11 and the sensor ID memorized in the ID storage portion 14, and outputs it to the transmitter 16. Moreover, the transmission controller 15 performs a transmission control routine, which will be mentioned later, to set up the transmission timing of the transmission data, and outputs the transmission data to the transmitter 16 at this set-up transmission timing. In this case, the transmission data may contain the acceleration Gx detected by the acceleration sensor 13.

When the transmission data outputted from the transmission controller 15 is inputted, the transmitter 16 will convert the transmission data into a radio signal, and will transmit to the ECU 50 through a transmission antenna 16a. The transmitter 16 transmits the above-mentioned radio signal at the timing when the transmission data is inputted. Therefore, the timing when the transmitter 16 transmits the radio signal is controlled by the transmission controller 15. This transmitter 16 is configured to be able to transmit only to the ECU 50 (bidirectional communication is impossible), and unilaterally transmits the above-mentioned radio signal. Hereafter, the information transmitted as a radio signal from the transmitter 16 (corresponding to the transmission data outputted from the transmission controller 15 to the transmitter 16) will be referred to as wheel information.

The battery 17 supplies electric power for operation to respective electrical loads in the sensor unit 10, and functions as a power supply.

Although the tire-pressure monitor system in the present embodiment has its feature in setting up the timing when the wheel information is transmitted from the sensor unit 10, the ECU 50 will be explained before an explanation of the transmission timing, since an outline of the whole system needs to be understood.

The ECU 50 comprises a microcomputer and a communication circuit as a principal part, and comprises a receiver 51, a reception treatment portion 52, a notification controller 53, a registered ID storage portion 54 and a wheel location discrimination portion 55, from a functional perspective. Moreover, the ECU 50 is connected with the annunciator 100 disposed near a driver's seat. The ECU 50 starts its operation when an ignition switch is turned on, and it stops its operation when the ignition switch is turned off.

The receiver 51 receives the radio signal transmitted from each sensor unit 10 through a reception antenna 51a. This receiver 51 receives the radio signals transmitted from the sensor units 10 fixed to the wheels W of not only the vehicle, but also many and unspecified other vehicles. The reception treatment portion 52 extracts data representing the sensor ID, the air pressure Px and the tire temperature Tx from the radio signal, whenever the receiver 51 receives the radio signal. The reception treatment portion 52 outputs data representing the sensor ID, the air pressure Px and the tire temperature Tx to the notification controller 53, and outputs data representing the sensor ID to the wheel location discrimination portion 55, at the timing when the receiver 51 receives the radio signal.

The notification controller 53 creates annunciation data which represents the air pressures Px of four wheels of the vehicle with respect to each wheel location based on the data inputted from the reception treatment portion 52 and the sensor IDs of the four wheels memorized in the registered ID storage portion 54.

The registered ID storage portion 54 is a non-volatile memory which memorizes the sensor IDs of the sensor units 10 attached to the wheels W of the vehicle in association with their wheel locations. The registered ID storage portion 54 comprises a front left wheel ID storage area 54FL for memorizing the sensor ID assigned to the sensor unit 10 of a front left wheel, a front right wheel ID storage area 54FR for memorizing the sensor ID assigned to the sensor unit 10 of a front right wheel, a rear left wheel ID storage area 54RL for memorizing the sensor ID assigned to the sensor unit 10 of a rear left wheel, and a rear right wheel ID storage area 54RR for memorizing the sensor ID assigned to the sensor unit 10 of a rear right wheel. Hereafter, the sensor IDs memorized by the registered ID storage portion 54 will be referred to as registered sensor IDs.

The notification controller 53 refers to a correspondence relation between the registered sensor IDs and the wheel locations memorized in the registered ID storage portion 54, creates the annunciation data which represents the air pressures Px of the four wheels according to their wheel locations based on the data inputted from the reception treatment portion 52, and outputs the created annunciation data to the annunciator 100. Moreover, the notification controller 53 compares the air pressure Px with a proper evaluation value Pref for every wheels, and outputs insufficient air pressure wheel location data which identifies the wheel location where the air pressure is insufficient to the annunciator 100 when the air pressure Px is less than the proper evaluation value Pref.

In addition, the notification controller 53 also judges whether the tire temperature Tx has become an unusually elevated temperature based on the inputted tire temperature Tx, and outputs tire overheat information to another vehicle controller which is not shown when an overheat status of a tire is detected. Moreover, the notification controller 53 may be configured to output overheated tire location data which specifies the wheel location of the overheated tire to the annunciator 100. Moreover, the notification controller 53 may be configured to correct the proper evaluation value Pref for judging the propriety of a tire pressure based on the tire temperature Tx.

The annunciator 100 comprises a display disposed in a location which can be sighted from a driver's seat, a display driver which drives the display, and a display microcomputer which controls the display driver, and displays a tire-pressure monitoring screen image on the display according to the annunciation data outputted from the notification controller 53, for example.

Figure 3:
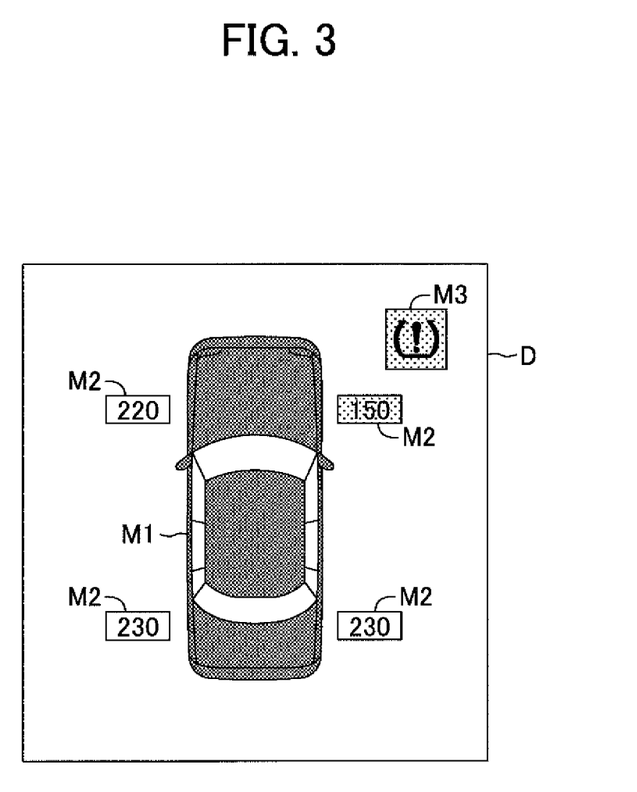
FIG. 3 is a drawing for showing a display screen image which an annunciator displays.

FIG. 3 represents a tire-pressure monitoring screen image D displayed on the display of the annunciator 100. A vehicle body mark M1 representing a top-view pattern of a vehicle body, air pressure value display portions M2 which are disposed corresponding to respective wheel locations and display numerical values of the tire pressures, and a warning mark M3 for calling a driver's attention are displayed on the tire-pressure monitoring screen image D.

The annunciator 100 displays the numerical values of the air pressures on the air pressure value display portions M2 based on the annunciation data inputted from the notification controller 53. Moreover, in the case where it is judged that the shortage of air pressure has occurred based on the insufficient air pressure wheel location data, it changes the display mode of the air pressure value display portion M2 at the wheel location (for instance, its background color and character color may be changed) and turns on the warning mark M3. The warning mark M3 is configured to be able to be sighted by a driver only when it is turned on, and to be unable to be sighted by a driver when it is turned off. Therefore, a driver can recognize which wheel lacks for air pressure, along with its air pressure value.

In addition, although the annunciator 100 indicates the numerical values of the tire pressures in the stage where the information controller 53 acquires the air pressure Px (stage where the receiver 51 has received the wheel information), the numerical values are not displayed while the air pressure Px has not yet been acquired. In the present embodiment, a mark of "–" etc. is displayed.

The wheel location discrimination portion 55 is a functional portion for distinguishing which wheel W has the sensor unit 10 that had transmitted the radio signal received by the receiver 51, that is, to which wheel W the sensor unit 10 specified by the sensor ID contained in the radio signal is attached, by estimation, and identifying its wheel location based on the discrimination result, and registering its sensor ID in the registered ID storage portion 54. The wheel location discrimination portion 55 starts its operation after the ignition switch is turned on, and ends its operation when the discrimination of wheel locations has been completed.

At the time of shipment, a vehicle has a correct relation between the wheel locations and the registered sensor IDs memorized by the registered ID storage portion 54. However, when a tire rotation is performed or a wheel W is replaced with another one thereafter, the registered situation (relation between the registered sensor IDs and the wheel locations) becomes different from an actual relation between the sensor IDs and the wheel locations. The wheel location discrimination portion 55 is prepared in order to cope with such an issue.

The wheel location discrimination portion 55 is connected with wheel-speed sensors 60. The wheel-speed sensors 60 are respectively prepared correspondingly to the respective wheels (running wheels) W, and output a predetermined number of pulse signals while the corresponding wheel W rotates one revolution. The wheel-speed sensors 60 attached to the vehicle in the present embodiment output 96 pulse signals while the corresponding wheel W rotates one revolution. That is, a pulse signal is outputted whenever the wheel W rotates a constant angle (3.75 degrees (=360/96)).

The wheel location discrimination portion 55 starts counting the pulse signal outputted by the wheel-speed sensor 60 at an arbitrary timing, returns the pulse count value back to "1" when the pulse count value exceeds "96", and resumes counting. The pulse count value thus converted into a value of "96" or less is referred to as a pulse number. For instance, when the pulse count value increases as 95, 96, 97, 98, 99 . . . , the pulse number will be set up so as to change as 95, 96, 1, 2, 3 . . . . The pulse number comes to a value representing the reminder resulted from a division of the pulse count value by the number of the pulse signals for one revolution of the wheel.

The pulse number serves as a parameter which can specify the rotational position of the wheel W in which the wheel-speed sensor 60 is disposed. Moreover, as will be mentioned later, the sensor unit 10 disposed in the wheel W circles around an axle-shaft center along with the rotation of the wheel W. Therefore, when the sensor unit 10 and the wheel-speed sensor 60 are disposed in a common wheel W, the turning position of the sensor unit 10 and the pulse number always have a fixed relation. All the wheels W do not necessarily rotate at the same speed, and their rotational speeds become different from one another due to an inner ring difference, an outer wheel difference, a slip, etc. For this reason, when the sensor unit 10 and the wheel-speed sensor 60 are not disposed in a common wheel W, the turning position of the sensor unit 10 and the pulse number do not have a fixed relation between them. Using such a principle, the wheel location discrimination portion 55 distinguishes to which wheel W the sensor unit 10 specified by the sensor ID contained in the received wheel information is attached. Since this processing which the wheel location discrimination portion 55 performs is related to the processing of the transmission controller 15 of the sensor unit 10, it will be mentioned later.

Figure 4:
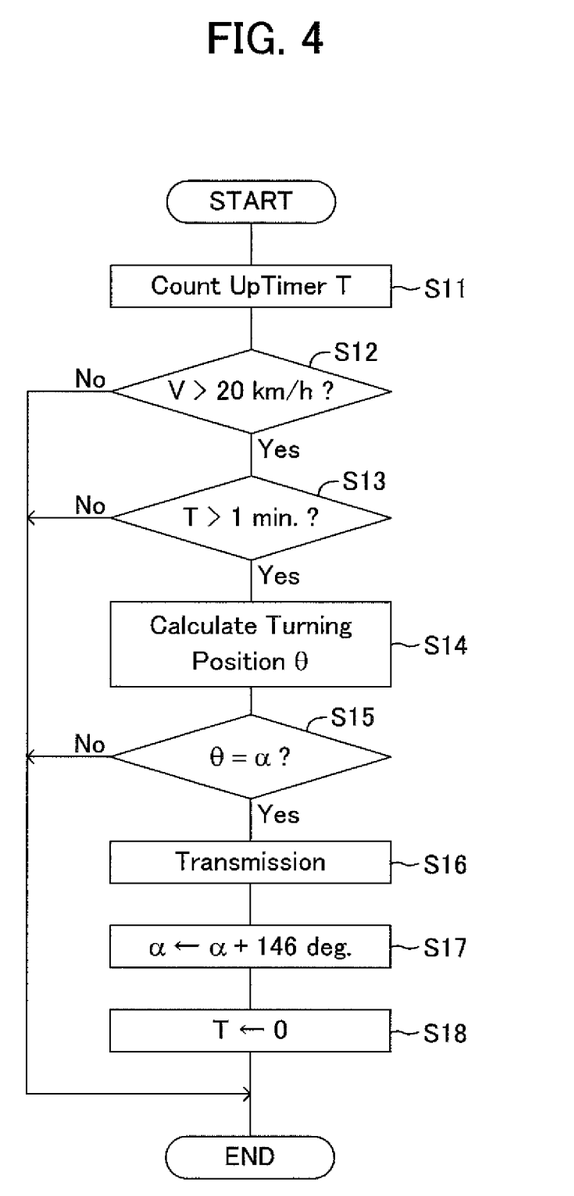
FIG. 4 is a flowchart for showing a transmission control routine.

Next, the processing of the transmission controller 15 for setting the timing for transmitting the wheel information will be explained. FIG. 4 shows a transmission control routine which the transmission controller 15 carries out. The transmission controller 15 repeatedly carries out the transmission control routine in a predetermined operation period during an electric power is supplied from the battery 17, that is, until the power supply capability of the battery 17 is lost.

When the transmission control routine is started, the transmission controller 15 counts up the value of a timer T by a predetermined value in step S11. The initial value of the timer T is set to zero. The predetermined value to count up is a value corresponding to an operation period. Then, the transmission controller 15 judges whether a vehicle speed V is larger than a set speed Vref in step S12. This set speed Vref is one condition which enables transmission of the wheel information from the sensor unit 10, can be set to an arbitrary value, and is set to 20 km/h in the present embodiment. In the drawing, the numerical value as a specific example is shown in order to make it easy to understand.

Figure 5:
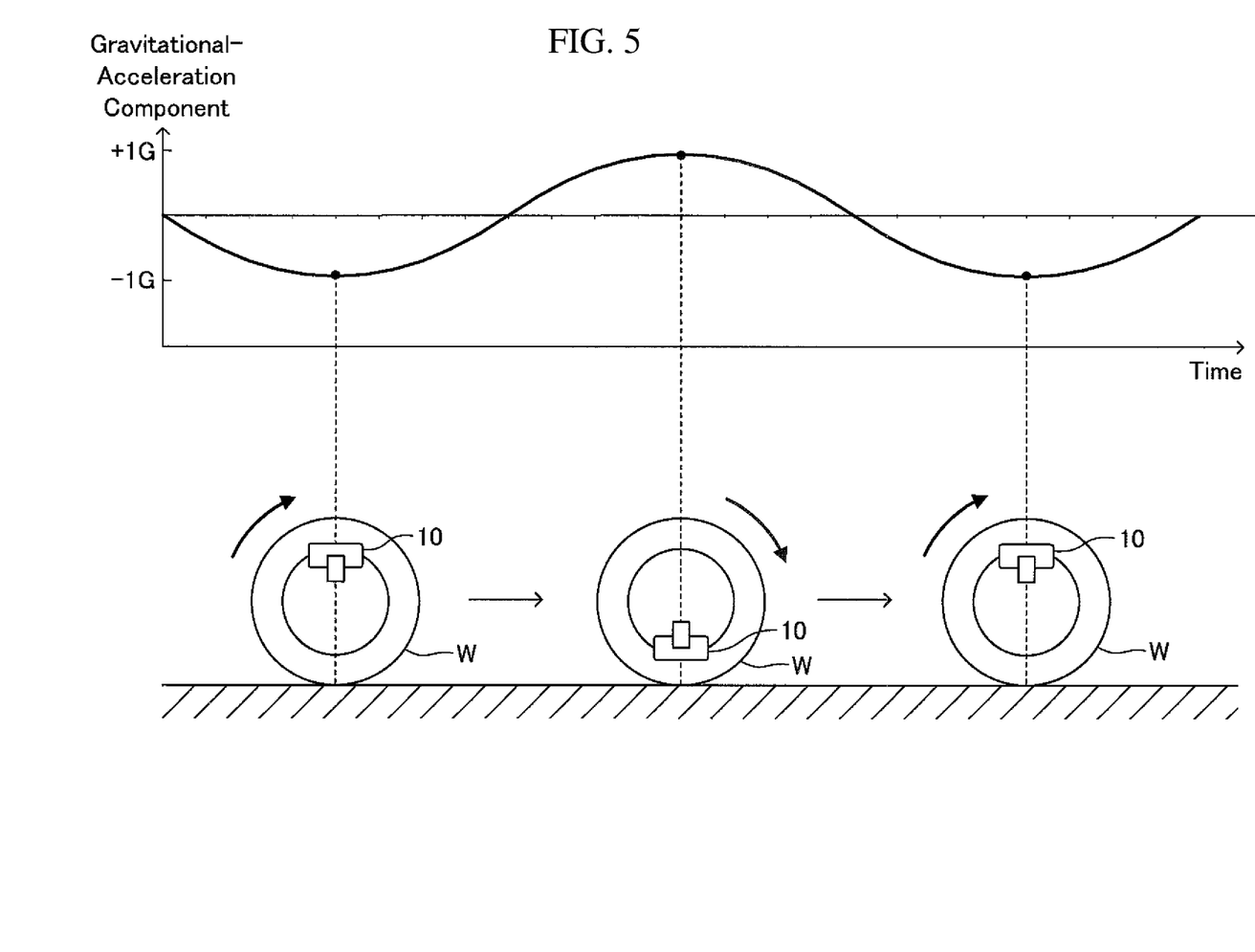
FIG. 5 is a drawing for showing a relation between the turning position of a sensor unit and a gravitational-acceleration component.

In this case, the transmission controller 15 estimates the vehicle speed V based on the acceleration Gx detected by the acceleration sensor 13. The acceleration sensor 13 used in the present embodiment detects the acceleration in a direction of centrifugal force of the wheel W (diameter direction). Since the acceleration sensor 13 rotates along with the wheel W to which the acceleration sensor 13 itself is attached, the acceleration Gx in a direction of centrifugal force is rippled by the influence of gravity in accordance with its own turning position (turning position of the sensor unit 10). This rippled component of the acceleration Gx in a direction of centrifugal force is a gravitational-acceleration component. The gravitational-acceleration component changes sinusoidally in a range from −1G to +1G, while the wheel W rotates one revolution, as shown in FIG. 5. The gravitational-acceleration component becomes −1G when the turning position of the acceleration sensor 13 comes to the uppermost location, and the component becomes 1G when the turning position comes to the lowermost location. The transmission controller 15 extracts the gravitational-acceleration component from the acceleration Gx by filtering processing, and estimates the vehicle speed V based on the pulsation period (period of ripple) of the gravitational-acceleration component. In addition, the larger the vehicle speed becomes, the larger the centrifugal force which acts on the acceleration sensor 13 becomes, and therefore it may be configured to estimate the vehicle speed V from the value obtained by subtracting the gravitational-acceleration component from the acceleration Gx.

The transmission controller 15 once ends the transmission control routine, when the vehicle speed V is not more than the set speed Vref (S12: No). The transmission controller 15 repeats the transmission control routine. When the vehicle speed V becomes larger than the set speed Vref while repeating such processing, the transmission controller 15 judges whether the timer T exceeds a set period Tref in step S13. This set period Tref is a time period set up in order to secure the time interval with which the sensor unit 10 transmits the wheel information, and it is set to 1 minute in the present embodiment. In the drawing, a numerical value as a specific example is shown in order to make it easy to understand.

The transmission controller 15 repeats such processing until the timer T exceeds the set period Tref. When the timer T exceeds the set period Tref, the transmission controller 15 calculates its own turning position θ (the turning position θ of the sensor unit 10) in step S14. In this case, the transmission controller 15 calculates the turning position θ of the sensor unit 10 based on the gravitational-acceleration component extracted from the acceleration Gx.

For instance, the turning position θ is represented by a rotation angle from a rotational position of 0° which is the rotational position of the wheel W whose sensor unit 10 is in the uppermost location. Therefore, the turning position θ when the gravitational-acceleration component becomes −1 G is represented as 0°. The transmission controller 15 has memorized association data in which the gravitational-acceleration component is associated with the turning position θ (for instance, a map and a function, etc. which have property as shown in FIG. 5), and calculates the turning position θ using the association data. In addition, since two solutions (turning positions θ) are calculated from the value of the gravitational-acceleration component, it is preferable to calculate the turning position θ in consideration of the derivative value (gradient) of the gravitational-acceleration component.

Then, the transmission controller 15 judges whether the turning position θ is the transmission setting location α in step S15. This transmission setting location α is for setting up the turning position θ of the sensor unit 10, which determines the timing when the wheel information is transmitted, and changes by a setting adjustment angle (degree) at every transmission of the wheel information, as will be mentioned later. The initial value of the transmission setting location α has been set to 0°.

The transmission controller 15 repeats the above-mentioned processing until the turning position θ becomes the transmission setting location α, and the transmission controller 15 outputs the transmission data to the transmitter 16 and makes the transmitter 16 transmit the wheel information when the turning position θ becomes the transmission setting location α. Therefore, the wheel information (the tire-pressure Px, the acceleration Gx, the tire temperature Tx, the sensor ID) at the time is transmitted from the transmitter 16 as a radio signal at the timing when the turning position θ of the sensor unit 10 arrived at the setting location α.

Then, the transmission controller 15 advances the transmission setting location α by a setting adjustment angle Δα in the turning direction in step S17. That is, the location obtained by adding the setting adjustment angle Δα to the transmission setting location α at present is set as the new transmission setting location α. This setting adjustment angle Δα is set to a value which is not a divisor of 360. In the present embodiment, although the setting adjustment angle Δα is set as 146 degrees, this is an example. In the drawing, the numerical value as a specific example is used in order to make it easy to understand. In addition, in this specification, the angle is shown using the degree measure.

Then, in step S18, the transmission controller 15 clears the timer T to zero, and once ends the transmission control routine. The transmission controller 15 repeatedly carries out the transmission control routine. Thereby, when the vehicle is running at a speed faster than the set speed Vref, the wheel information is transmitted at the timing when the turning position θ of the sensor unit 10 arrives at the transmission setting location α for the first time after 1 minute has passed since the last transmission of the wheel information. And, the transmission setting location α is updated so that the turning position θ of the sensor unit 10 which transmits the next wheel information is advanced by the setting adjustment angle Δα at every transmission of the wheel information.

Figure 6:
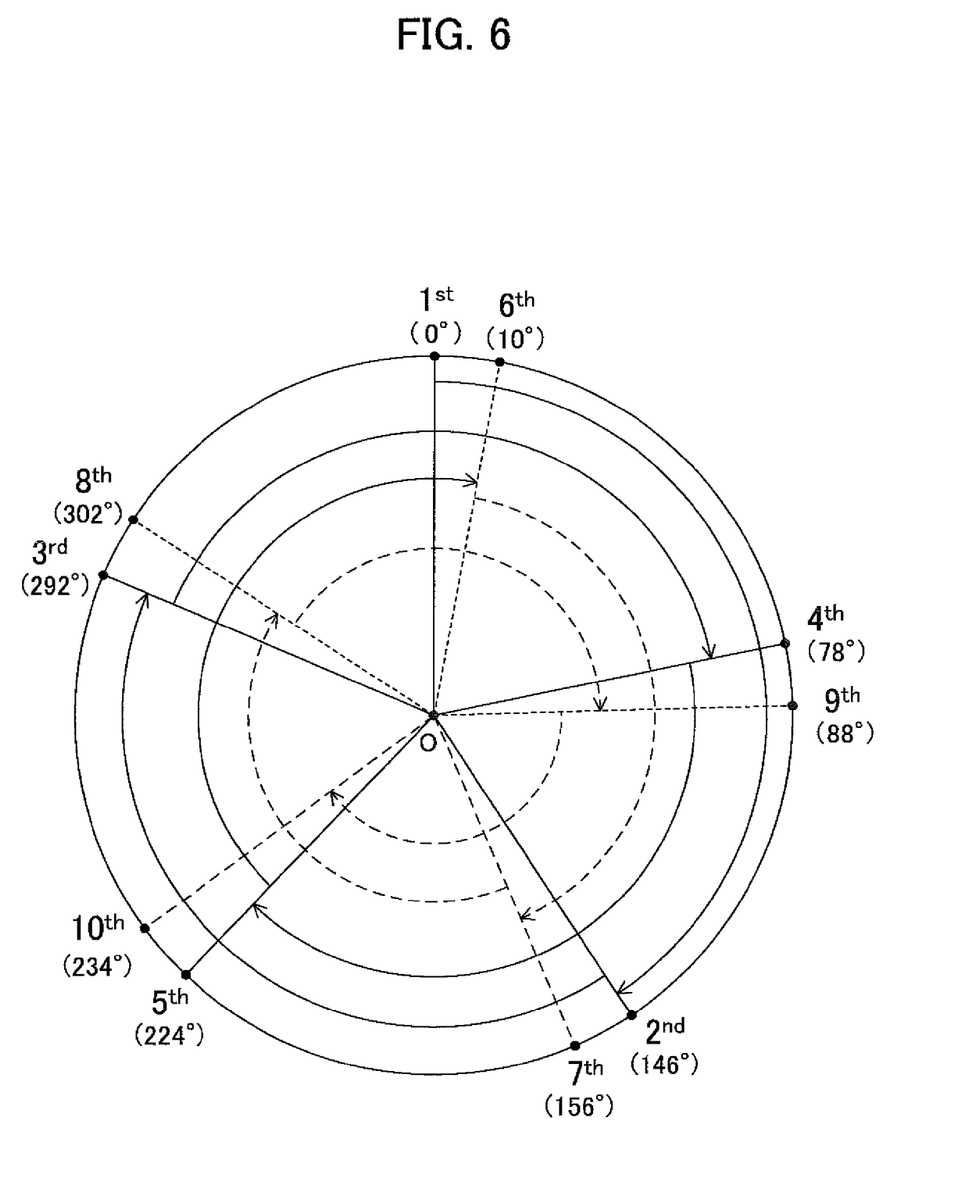
FIG. 6 is a drawing for showing transition of the transmission setting location α.

FIG. 6 is a drawing for showing the change of the turning position (transition of the transmission setting location α) of the sensor unit 10 when the wheel information is transmitted as an image. The sensor unit 10 circles around an axle-shaft center O as a center along with the rotation of the wheel W.

The timing when the wheel information is transmitted for the first time after the start-up of the transmission control routine is a time of the turning position θ of the sensor unit 10 being 0°, that is, the sensor unit 10 being at the uppermost location. The timing when the wheel information is transmitted for the second time is 1 minute after the transmission of the wheel information, and is a time of the turning position θ of the sensor unit 10 reaching at 146° for the first time.

This turning position θ is a location which is specified by adding 146 degrees to the turning position θ at which the wheel information was transmitted last time (first time). Similarly, the timing when the wheel information is transmitted for the third time is 1 minute after the transmission of the wheel information, and is a time of the turning position of the sensor unit 10 reaching at 292° (146°+146 degrees) for the first time. In addition, in this specification, a turning position on a coordinate on the basis of the uppermost location is indicated using "°", and a relative angle is indicated using "degree."

Thus, the transmission timing of the wheel information is determined by the transmission setting location α which specifies the turning position θ of the sensor unit 10. Furthermore, the transmission setting location α is set up so as to be increased by the setting adjustment angle Δα (146 degrees). For this reason, as shown in FIG. 6, the wheel information is never lopsidedly transmitted in certain turning positions, but in the turning positions distributed evenly over the whole circumference of the wheel W.

Here, a setup of setting adjustment angle Δα will be explained. The number of times that the sensor unit 10 can transmit the wheel information per unit time is restricted by the battery life. Moreover, the battery life needs to be comparable as the life-time of a vehicle (namely, there is a demand to make a replacement of the battery 17 unnecessary). Furthermore, it is necessary to make the time period required for detection of a tire pressure on the ECU 50 side within the demanded time.

For instance, in the tire-pressure monitor system; there shall be a demand for enabling it to detect the tire pressure Px on the ECU 50 side within 5 minutes, in a situation where the vehicle is running faster than a set vehicle speed (for instance, 20 km/h). That is, a case that the newest wheel information within the latest 5 minute can be always received on the ECU 50 side is assumed during the vehicle is running. Moreover, the number of times of transmission of the wheel information for the 5 minutes shall be restricted to 5 times according to the demand to a battery life (demand for eliminating a battery replacement). Therefore, in this tire-pressure monitor system, it is demanded so that that wheel information can be received on the ECU 50 side at least once among the predetermined number (5 times) of transmissions of the wheel information.

In order to be able to receive the wheel information by the ECU 50 at least once among the five transmissions of the wheel information, it is preferable to set an interval (degree) of the transmission setting location α to 72 degrees which is obtained by carrying out a division (equally dividing) 360 degrees corresponding to one revolution of the wheel by 5 which is the predetermined number. The transmission setting location alfa can be more early distributed over the whole circumference of the wheel W by shifting the setting adjustment angle Δα±90 or more degrees with respect to the turning position θ when transmitting last time. In that case, when the setting adjustment angle Δα is set to a value of the divisor of 360, the transmission setting location α returns to its original value (past transmission setting location α) in an early stage while the transmission is repeated, and it becomes impossible to further shift the transmission setting location α.

Then, in this example, 72 degrees obtained by equally dividing 360 degrees by the number of times of transmissions is changed into 73 degrees which is not the divisor of 360, and further, the 73 degrees is multiplied by integer so that the setting adjustment angle Δα falls within a range of 90 degrees <Δα<270 degrees. In this case, although 146 degrees (73×2) and 219 degrees (73×3) are lined up as candidates, 146 degrees which is the value closer to 180 degrees is adopted here. That is, the setting adjustment angle Δα is set so that the next transmission setting location α becomes closer to the diagonal position location (location which is point-symmetric across the wheel rotation center O) with respect to the turning position θ at present.

Thus, when the setting adjustment angle Δα is set to 146 degrees, the transmission setting locations α are set as the turning positions which are assigned by almost evenly dividing the whole circumference of the wheel W by the predetermined number as shown in FIG. 6, and are not lopsidedly assigned to certain turning positions. Furthermore, since the setting adjustment angle Δα is set to the value which is not a divisor of 360, the transmission setting location α never returns to its original location in an early stage, and is set up so as to shift over the whole circumference of the wheel W. Furthermore, since the setting adjustment angle Δα is set up so as to fall within the range of 90 degrees <Δα<270 degrees, the transmission setting location α can be distributed to the whole circumference of the wheel W in an early stage. For this reason, even if the transmission setting location α at the time of transmission of the wheel information for the first time fell within a Null region, the transmission setting location α can shift out of the Null region early.

Therefore, in the ECU 50, even when the Null region in which the wheel information which the sensor unit 10 transmits cannot be received exists, the wheel information can be received with a very high probability within a predetermined number. That is, the wheel information which the sensor unit 10 transmits can be efficiently received by ECU 50. As a result, the interval in which the sensor unit 10 transmits the wheel information can be lengthened, and the consumption of the battery 17 can be suppressed. Thereby, downsizing of the battery 17 can be attained and, as a result, the downsizing of the sensor unit 10 can be attained. Moreover, since the ECU 50 makes the annunciator 100 display a tire pressure in the stage in which the wheel information is acquired (in stage where the wheel information can be received), it becomes possible for the annunciator 100 to notify the tire pressure in an early stage.

In a conventional device, when the wheel information is transmitted the fixed period, although the turning positions of the sensor unit 10 at the time of transmission become random, they may become lopsided to the Null region. For this reason, in order to make as small as possible the probability that the wheel information cannot be received at all within the predetermined number of times of transmissions, a quite high receiving ability is required to a receiver end (corresponding to the ECU 50), and it is difficult to be attained. Moreover, although the transmission period of the wheel information just needs to be shortened in order to make it possible to receive the wheel information one or more within a predetermined demanded time, the consumption of the battery 17 will become larger and the battery life will be shortened in that case.

On the contrary, in accordance with the present embodiment, even when the wheel information is transmitted in the transmission period which meets the demand of a battery life, the ECU 50 can receive the wheel information within a demanded time with a very high probability.

As another example, a case where it is required that the newest wheel information should be received on the ECU 50 side within 10 minutes will be explained. When the limitation due to the battery life is the same as that in the above-mentioned example, what is necessary is just to enable it to receive the wheel information on the ECU 50 side at least once among ten transmissions of the wheel information.

In this example, 36 degrees obtained by equally dividing 360 degrees by a predetermined number 10 is changed into a value which is not a divisor of 360, for instance, 41 degrees. Although the setting adjustment angle $\Delta\alpha$ may be set to 41 degrees so that the transmission setting locations $\alpha$ may be in order of 0 degrees, 41 degrees, 82 degrees and 123 degrees, as mentioned above, in order to make them distribute over the whole circumference of the wheel W early, the setting adjustment angle $\Delta\alpha$ is made into an integral multiple ($\geq 2$) of 41 degrees, and it is made to fall within a range from 90 degrees to 270 degrees. For instance, the setting adjustment angle $\Delta\alpha$ is set to 205 degrees close to 180 degrees ($\Delta\alpha=205$ degrees).

In this case, the transmission setting location $\alpha$ transitions in order of 0 degree, 205 degrees, 50 degrees (=410−360), 255 degrees, 100 degrees (=460−360), 305 degrees, 150 degrees (=510−360), 355 degrees, 200 degrees (=560−360), 45 degrees (=405−360). Therefore, in the ECU 50, even when the Null region in which a radio signal which the sensor unit 10 transmits cannot be received exists, the radio signal can be received with a very high probability within a demanded time period.

Next, the wheel location discrimination processing in the wheel location discrimination portion 55 of the ECU 50 will be explained. As mentioned above, the sensor unit 10 transmits the wheel information at the timing when its own turning position $\theta$ arrives at the transmission setting location $\alpha$. This transmission setting location $\alpha$ shifts at every transmission by the setting adjustment angle $\Delta\alpha$. Therefore, at the timing when the ECU 50 receives the wheel information, also as for the pulse number (corresponding to the wheel rotational position) of the wheel-speed sensor 60 of the wheel W where the sensor unit 10 which transmits the wheel information is disposed, the pulse number shifts at every reception by the number corresponding to the setting adjustment angle $\Delta\alpha$.

For instance, when the setting adjustment angle $\Delta\alpha$ is set to 146 degrees as in the above-mentioned example, the pulse number is advanced by 39 whenever the wheel information is received (increased), as expressed by the following formula.

$$(146/360) \times 96 \approx 39$$

Therefore, when the sensor unit 10 and the wheel-speed sensor 60 are disposed in a common wheel W, the pulse number of the wheel-speed sensor 60 at the transmission timing should be always increased by 39 increments fundamentally (when a detection error etc. are not taken into consideration) whenever the wheel information is transmitted from the sensor unit 10. On the other hand, when the sensor unit 10 and the wheel-speed sensor 60 are not disposed in a common wheel W, the pulse number of the wheel-speed sensor 60 at the transmission timing is not always increased by 39 increments. This is because a rotational-speed difference due to an inner ring difference, an outer wheel difference and/or a slip, etc. arises between one wheel in which the sensor unit 10 is disposed and the other wheel in which the wheel-speed sensor 60 is disposed.

Therefore, it can be distinguished to which wheel W the sensor unit 10 specified by the sensor ID included in the wheel information is attached, by sampling the variation of the pulse number of the wheel-speed sensor 60 at the transmission timing for every wheel W, respectively. In addition, since the pulse number will be reset to 1 when it exceeds 96, the increase of the pulse number may be computed based on the value after being reset in that case.

Figure 7:
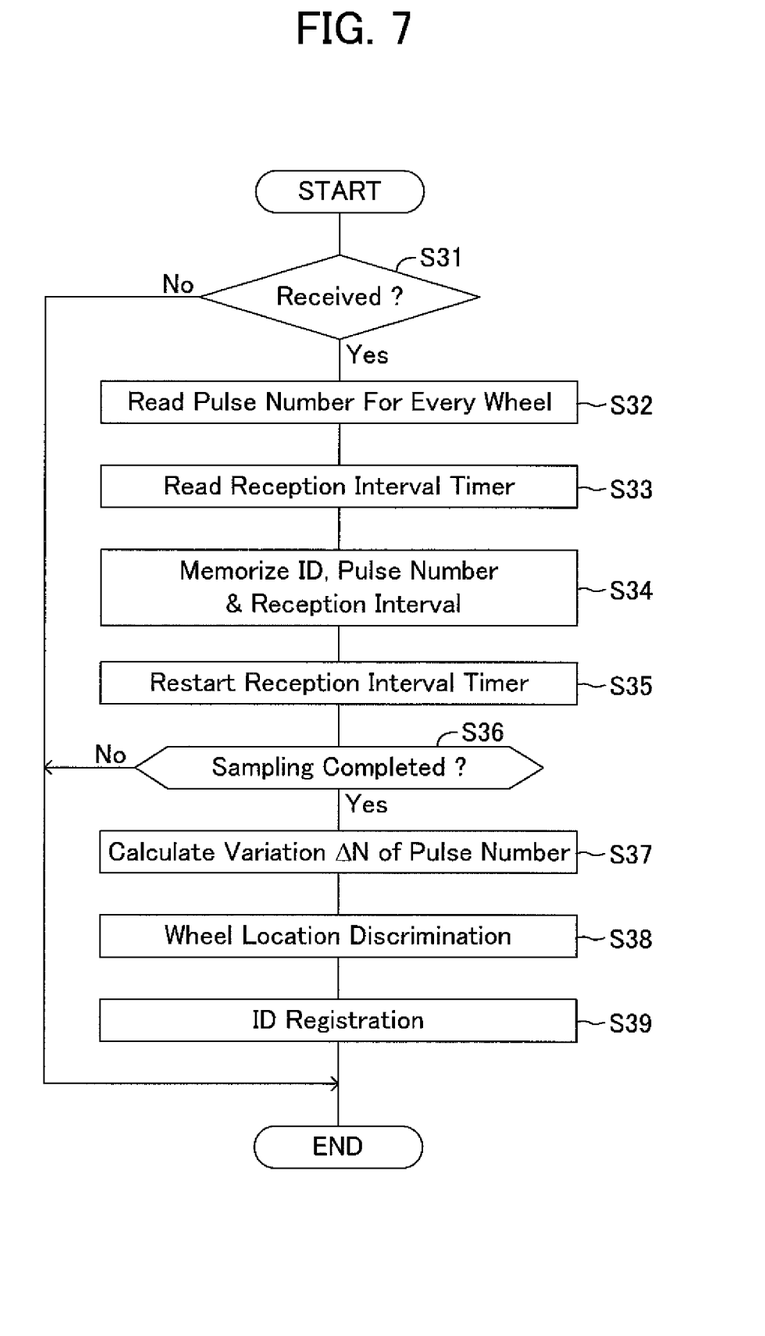
FIG. 7 is a flowchart for showing a wheel location discrimination routine.

FIG. 7 shows the wheel location discrimination routine which the wheel location discrimination portion 55 carries out. The wheel location discrimination portion 55 will repeatedly carry out the wheel location discrimination routine in a predetermined short operation period when an ignition switch is turned on, and will end the wheel location discrimination routine when the wheel location discrimination of respective sensor units 10 has been completed and the sensor IDs have been registered.

When the wheel location discrimination routine is started, the wheel location discrimination portion 55 judges whether the wheel information (radio signal) transmitted from the sensor unit 10 is received in step S31. This wheel information may also include the wheel information transmitted from the sensor unit 10 of another vehicle. The wheel location discrimination portion 55 once ends the wheel location discrimination routine, when the wheel information is not received. The wheel location discrimination portion 55 repeatedly carries out the wheel location discrimination routine in a predetermined short operation period. When the wheel information is received from an arbitrary sensor unit 10 (S31: Yes), the wheel location discrimination portion 55 reads the pulse numbers of the four wheel-speed sensors 60 at the timing when the wheel information is received, in step S32.

Then, the wheel location discrimination portion 55 reads a reception interval which the reception interval timer clocks, in step S33. This reception interval timer measures the reception interval which is a time period from receiving the wheel information last time until receiving it this time, for every sensor ID. Since the reception interval timer has not yet been started immediately after a start-up of the wheel location discrimination routine, the reception interval comes to 0.

Then, in step S34, the wheel location discrimination portion 55 memorizes the sensor IDs included in the wheel information received this time, the pulse numbers of the four wheel-speed sensors 60 read in step S32, and the reception intervals read in step S33, in association with one another. Processing in this step S34 is referred to as a sampling of the pulse number.

Then, the wheel location discrimination portion 55 restarts the reception interval timer in step S35. Therefore, the reception interval until the wheel information including the sensor ID included in the wheel information received at this point of time is received next time is clocked. In addition, since each sensor unit 10 transmits the wheel information at an interval of about 1 minute, the reception interval is about 1 minute fundamentally. However, when the transmission location of the sensor unit 10 falls within the Null region, the reception interval may become whole-number ($\geq 2$) multiple thereof, such as 2 minutes and 3 minutes. Therefore, it is enough that the resolving power of the data representing the reception interval memorized in step S34 is as much as to be able to distinguish a 1-minute interval.

Then, the wheel location discrimination portion 55 judges whether the sampling of the pulse number has been completed in step S36. For instance, it is judged whether the sampling number of pulse numbers has reached the normality number, as for the four sensor IDs or more. The wheel location discrimination portion 55 repeats such processing (S31 to S36) until the sampling number reaches a defined number. Therefore, the sensor ID included in the wheel information, the reception interval, and the pulse numbers of the four wheel-speed sensors 60 are successively memorized whenever the wheel information is received.

The sampling of the pulse number is performed also as for the sensor ID transmitted from the sensor unit 10 of another vehicle (since the vehicle and another vehicle has not yet been distinguished as for the sensor IDs at this time). In this case, it can be presumed that the sensor ID whose sampling number has finally reached the defined number includes at least the sensor IDs of the four sensor units 10 disposed in the wheels W of the vehicle.

When an end condition of the sampling is thus satisfied (S36: Yes), the wheel location discrimination portion 55 calculates a variation ΔN of the pulse number in step S37, for each sensor ID whose sampling number has reached the defined number. For instance, among the sampling data, for the respective of the target data whose reception interval is shown as 1 minute, the variation ΔN of the pulse number of the four wheel-speed sensors 60 in the reception interval (1 minute) is calculated. This variation ΔN is a value obtained by subtracting last time value from this time value of the pulse number, and 96 just has to be added to its value when its value becomes negative. This variation ΔN is calculated, for every sensor ID, for the respective of the pulse numbers of the four wheel-speed sensors 60. Namely, the number of variations ΔN is the same as the number of the target data.

Then, the wheel location discrimination portion 55 distinguishes to which wheel W the sensor unit 10 specified by the sensor ID included in the wheel information is attached, based on the variation ΔN, in step S38. A plurality of the variations ΔN is calculated for the respective of the pulse numbers of the four wheel-speed sensors 60. When the sensor unit 10 and the wheel-speed sensor 60 are disposed in a common wheel W, the variation ΔN of the pulse number corresponding to the sensor ID stably takes a value of 39 or close to 39 if the reception interval if the data is 1 minute, and does not vary greatly, respectively. If the reception interval is 2 minutes, the variation ΔN of the pulse number corresponding to the sensor ID stably takes a value of 78 (=39×2) or close to 78, and does not vary greatly, respectively. That is, the variation ΔN of the pulse number corresponding to the sensor ID takes the same value as the whole-number (≥2) multiple of 39, or a value close to the whole-number (≥2) multiple of 39, and does not vary greatly.

Therefore, the wheel location discrimination portion 55 judges the wheel location in which the wheel-speed sensor 60 for which the property nearest to such property is acquired is disposed as the wheel location in which the sensor unit 10 specified by the sensor ID is disposed. Thereby, the sensor ID of the sensor unit 10 of another vehicle is eliminated.

After the wheel location discrimination portion 55 distinguishes the wheel location for every sensor ID in step S38, the wheel location discrimination portion 55 registers the sensor ID into the registered ID storage portion 54 in subsequent step S39. That is, the sensor ID distinguished for every wheel location, which is memorized at present, is overwritten with the sensor ID distinguished in step S38. After the sensor IDs of the four wheels have been registered in this way, the wheel location discrimination portion 55 ends the wheel location discrimination routine (does not repeat it).

Thus, since the wheel location discrimination is performed based on the variation ΔN of the pulse number corresponding to the setting adjustment angle Δα in accordance with the wheel location discrimination routine, even if the turning position θ at which the sensor unit 10 transmits the wheel information changes at every transmission, the wheel location discrimination of the sensor unit 10 can be performed successfully.

Although the tire-pressure monitor system comprising the tire-pressure sensor unit and tire-pressure information device according to the present embodiment has been explained as the above, the present invention is not limited to the above-mentioned embodiments, and various modifications are possible for the present invention unless they deviate from the objective of the present invention.

For instance, although the present embodiment is configured so that the transmission setting location α is advanced in the turning direction by the setting adjustment angle Δα at every transmission of the wheel information (FIG. 4, S17), it may be configured so that the transmission setting location α is retarded by the setting adjustment angle Δα (advanced in a direction opposite to the turning direction), alternatively. In this case, in step S17 of the transmission control routine, the transmission controller 15 sets the location obtained by subtracting the setting adjustment angle Δα from the transmission setting location α at present, as the new transmission setting location α(α=α−146 degrees).

Moreover, although the pulse signal outputted by the wheel-speed sensor 60 is directly inputted into the ECU 50 in the present embodiment, for example, it may be configured so that the information representing the output number of the pulse signals is taken into the ECU 50 from a brake control device (not shown) which is inputted the pulse signal outputted by the wheel-speed sensor 60 to calculate a wheel speed. The brake control device counts the number of the pulse signals outputted by the wheel-speed sensor 60 in a predetermined time period (for instance, 30 milliseconds), and outputs the information (wheel-speed information) representing the count number in a predetermined time period. Therefore, the ECU 50 may be configured to count the number of pulse signals by accumulating the count value of the pulse signals which the brake control device outputs, and to obtain the pulse number from this number.

Moreover, although the ECU 50 has a function to automatically distinguish the wheel location of each sensor unit 10 in the present embodiment, it is not necessary for the ECU 50 to necessarily comprise such a function, and it may be configured so that the sensor ID is updated and memorized in the registered ID storage portion 54 manually (by a human operation), for instance.

REFERENCE SIGNS LIST

10: tire-pressure sensor unit (sensor unit), 11: pneumatic sensor, 12: temperature sensor, 13: acceleration sensor, 14: ID storage portion, 15: transmission controller, 16: transmitter, 16a: transmission antenna, 17: battery, 50: ECU, 51: receiver, 51a: reception antenna, 52: reception processing portion, 53: information controller, 54: registered ID storage portion, 55: wheel location discrimination portion, 60:

wheel-speed sensor, 100: annunciator, B: vehicle body, W: wheel, θ: turning position, α: transmission setting location.

The invention claimed is:
1. A tire-pressure sensor unit comprises:
 a pneumatic sensor which detects a tire pressure,
 a transmitter which transmits wheel information that is information including tire-pressure information representing the tire pressure detected by said pneumatic sensor and a unique sensor ID as a radio signal, and
 a battery prepared as an internal electrical power source, and
 said tire-pressure sensor unit is fixed to and disposed in a wheel and circles around an axle shaft along with the rotation of said wheel, wherein;
 said tire-pressure sensor unit further comprises:
 a turning-position detection means to detect the turning position of said tire-pressure sensor unit around the axle shaft,
 a transmission control means to make said transmitter transmit said wheel information at the timing when the turning position detected by said turning-position detection means arrives at a transmission setting location,
 a transmission location setting means to calculate a turning position which is advanced or retarded a setting adjustment angle (Δα degree) set to a value (Δα) which is not a divisor of 360, with respect to the turning position when said wheel information is transmitted last time, and to set this turning position obtained by calculating as a transmission setting location for transmitting said wheel information next time.

2. The tire-pressure sensor unit according to claim 1, wherein:
 said setting adjustment angle is set to a value which is larger than 90 degrees and smaller than 270 degrees.

3. The tire-pressure sensor unit according to claim 1, wherein:
 said transmission control means is configured to make said transmitter transmit said wheel information at the timing when the turning position detected by said turning-position detection means arrives at the transmission setting location set by said transmission location setting means for the first time after a predetermined set period has passed since said wheel information was transmitted last time.

4. A tire-pressure information device which receives said wheel information transmitted from the tire-pressure sensor unit according to claim 1 and reports said tire-pressure information to a driver in distinction to every wheel location, comprising:
 a wheel rotational-position detection means to detect the rotational positions of respective wheels based on the count values obtained by counting, for respective wheel-speed sensors, the numbers of pulse signals which are output signals of a plurality of the wheel-speed sensors disposed for respective of said wheels and are outputted whenever the respective of said wheels rotates a predetermined angle,
 a variation detection means to acquire the rotational position of respective wheels detected by said wheel rotational-position detection means whenever receiving said wheel information transmitted from the respective of said tire-pressure sensor units, and to detect the rotational-position variation which is a variation of the rotational position of a wheel when the wheel information is received this time with respect to the rotational position of the wheel when the wheel information was received last time, for every said sensor ID and for each wheel, and
 a wheel location discrimination means to distinguish the location of a wheel to which the tire-pressure sensor unit specified by said sensor ID is attached, based on a relation between the rotational-position variation detected by said variation detection means and said setting adjustment angle.

5. The tire-pressure sensor unit according to claim 2, wherein:
 said transmission control means is configured to make said transmitter transmit said wheel information at the timing when the turning position detected by said turning-position detection means arrives at the transmission setting location set by said transmission location setting means for the first time after a predetermined set period has passed since said wheel information was transmitted last time.

6. A tire-pressure information device which receives said wheel information transmitted from the tire-pressure sensor unit according to claim 2 and reports said tire-pressure information to a driver in distinction to every wheel location, comprising:
 a wheel rotational-position detection means to detect the rotational positions of respective wheels based on the count values obtained by counting, for respective wheel-speed sensors, the numbers of pulse signals which are output signals of a plurality of the wheel-speed sensors disposed for respective of said wheels and are outputted whenever the respective of said wheels rotates a predetermined angle,
 a variation detection means to acquire the rotational position of respective wheels detected by said wheel rotational-position detection means whenever receiving said wheel information transmitted from the respective of said tire-pressure sensor units, and to detect the rotational-position variation which is a variation of the rotational position of a wheel when the wheel information is received this time with respect to the rotational position of the wheel when the wheel information was received last time, for every said sensor ID and for each wheel, and
 a wheel location discrimination means to distinguish the location of a wheel to which the tire-pressure sensor unit specified by said sensor ID is attached, based on a relation between the rotational-position variation detected by said variation detection means and said setting adjustment angle.

7. A tire-pressure information device which receives said wheel information transmitted from the tire-pressure sensor unit according to claim 3 and reports said tire-pressure information to a driver in distinction to every wheel location, comprising:
 a wheel rotational-position detection means to detect the rotational positions of respective wheels based on the count values obtained by counting, for respective wheel-speed sensors, the numbers of pulse signals which are output signals of a plurality of the wheel-speed sensors disposed for respective of said wheels and are outputted whenever the respective of said wheels rotates a predetermined angle,
 a variation detection means to acquire the rotational position of respective wheels detected by said wheel rotational-position detection means whenever receiving said wheel information transmitted from the respective of said tire-pressure sensor units, and to detect the rotational-position variation which is a variation of the rotational position of a wheel when the wheel information is received this time with respect to the rotational position of the wheel when the wheel information was received last time, for every said sensor ID and for each wheel, and a wheel location discrimination means to distinguish the location of a wheel to which the tire-pressure sensor unit specified by said sensor ID is attached, based on a relation between the rotational-position variation detected by said variation detection means and said setting adjustment angle.

8. A tire-pressure information device which receives said wheel information transmitted from the tire-pressure sensor unit according to claim 5 and reports said tire-pressure information to a driver in distinction to every wheel location, comprising:

a wheel rotational-position detection means to detect the rotational positions of respective wheels based on the count values obtained by counting, for respective wheel-speed sensors, the numbers of pulse signals which are output signals of a plurality of the wheel-speed sensors disposed for respective of said wheels and are outputted whenever the respective of said wheels rotates a predetermined angle, a variation detection means to acquire the rotational position of respective wheels detected by said wheel rotational-position detection means whenever receiving said wheel information transmitted from the respective of said tire-pressure sensor units, and to detect the rotational-position variation which is a variation of the rotational position of a wheel when the wheel information is received this time with respect to the rotational position of the wheel when the wheel information was received last time, for every said sensor ID and for each wheel, and a wheel location discrimination means to distinguish the location of a wheel to which the tire-pressure sensor unit specified by said sensor ID is attached, based on a relation between the rotational-position variation detected by said variation detection means and said setting adjustment angle.

* * * * *